April 14, 1936.  H. BEHRENS  2,037,305

TRANSMISSION MECHANISM FOR MOTOR VEHICLES

Filed April 12, 1932

Inventor
Heinrich Behrens.

Patented Apr. 14, 1936

2,037,305

UNITED STATES PATENT OFFICE 2,037,305

TRANSMISSION MECHANISM FOR MOTOR VEHICLES

Heinrich Behrens, Altona-Stellingen, Germany, assignor of one-third to Luise Sieg, Altona-Elbe, Germany, and one-third to Rudolf Groth, Altona-Othmarschen, Germany Application April 12, 1932, Serial No. 604,768
In Germany April 17, 1931

1 Claim. (Cl. 180—17)

This invention relates to a device for motor vehicles operating during the steering in which the drive between the engine shaft and the two rear wheels can be engaged and disengaged by a cone clutch for each wheel.

Devices for the same purpose are known, but these are open to the objection that they do not guarantee reliable operation as there is a danger of the coupling cones slipping when a rigid connection between the engine shaft and the two rear wheels has to be established. The invention relates to a device of the type described, by means of which the above mentioned objection is overcome in a simple manner in that locking claws capable of engaging in notches in the driving cone extend through the driven cone.

This combination of the two known clutches presents the advantage that, when steering the vehicle, a reliable and gentle engagement and disengagement of the rear wheels is ensured and an unintentional slipping of the driving clutch cone is prevented in that, when engaging a rear wheel, first the counter cone is pressed gently against the clutch cone driven by the engine and then the locking claws can engage in the notches of the driving clutch cone, whereas during the disengagement of a rear wheel first the locking claws are lifted out of the notches of the driving clutch cone and then the counter cone is disengaged.

An embodiment of the invention is illustrated by way of example in the accompanying drawing in which:—

Figure 1:
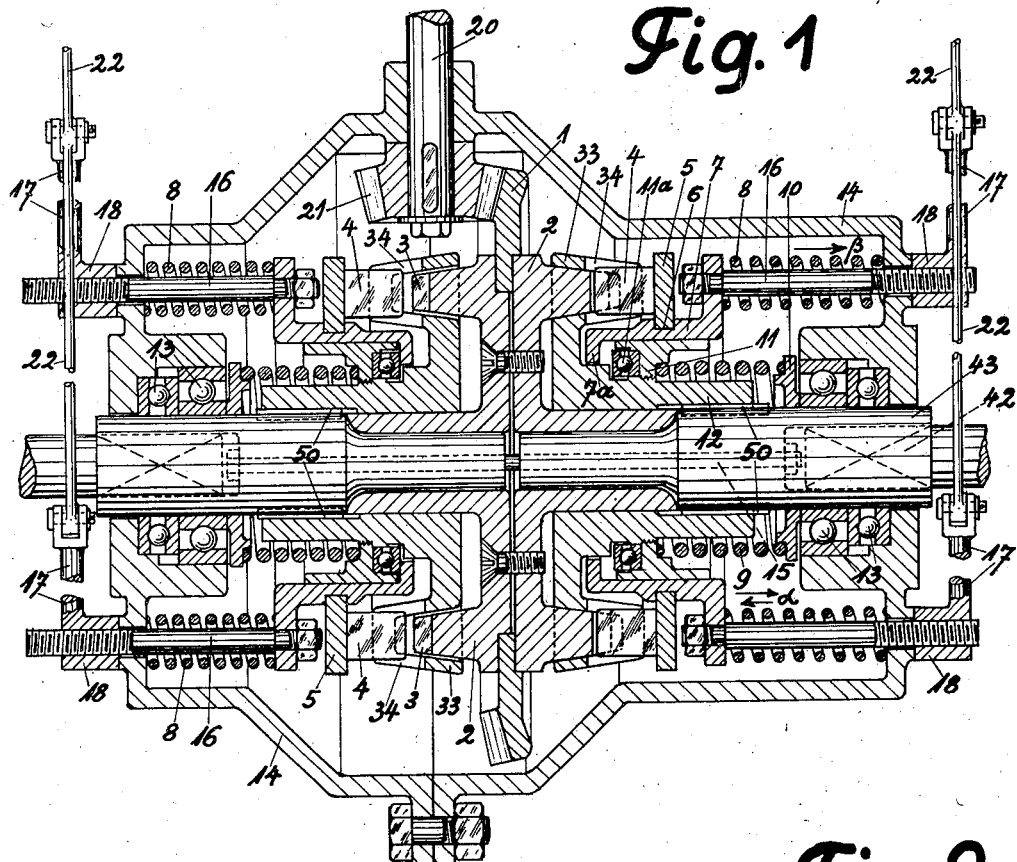
Figure 2:
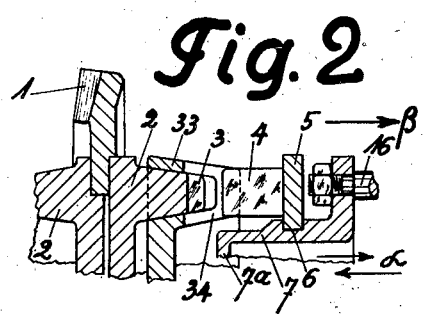

Fig. 1 shows a longitudinal section of the device.
Fig. 2 shows a detail partly in section.

A shaft 20 driven by the engine acts through the intermediary of a bevel wheel 21 on a bevel wheel 1 rigidly connected to a double clutch cone 2. Each clutch cone 2 cooperates with a counter cone 33 and has on the end face of its circumference notches 3 in which locking claws 4 can engage. The driven counter cone 33 is arranged between the clutch cone 2 and the locking claws 4 fixed on a slide ring 5. To enable the claws 4 to engage in the notches 3 of the driving clutch cone 2, the driven clutch cone 33 has on its circumference recesses 34 in which the locking claws 4 can shift. The slide ring 5 is rigidly connected with the locking claws and engages in a groove 6 in a sleeve 7 rotatably mounted on the hub 12 of the cone 33, so that the ring 5 is shiftable with this sleeve in the direction of the arrow α. The sleeve 7, the locking claws 4 and the slide ring 5 are pressed by springs 8 and the counter cone 33 is pressed by spring 9 against the clutch cone 2. The spring 9 bears against a collar 10 on an axle sleeve 43 and against a collar 11 screwed on to the hub 12 on the counter cone 33. The hub 12 of the counter cone 33 is connected to the sleeve 43 by keys 50, and it is shiftable in axial direction on the sleeve 43 and rotatable together with this sleeve. The bevel wheel 1 is rotatable together with the double clutch cone 2 on the sleeves 43. The device is mounted by means of ball bearings 13 in a casing 14 of the rear axle bridge. The rear running wheels are fixed by means of stub axles in axle holes 42, one in each of the sleeves 43 held together by a loosely rotatable bolt 15. The sleeves 43 serve as carrier for the double clutch cone 2. The device can easily be dismantled by unscrewing the bolt 15, whereas the bolt 15 facilitates the fitting together of the device. On the free end of the sleeve 7 bolts 16 with steep screw threads are fixed. The steep screw thread is surrounded by eyes 18 of levers 17 provided with a corresponding counter screw thread, said levers acting upon a rod system 22 shiftable during the steering of the vehicle.

If therefore the two levers 17 shown on the right side of Fig. 1 are swung in one direction by the rod system 22, the two eyes 18 swing therewith. Thus, the two rods 16 situated on the right side of Fig. 1 and consequently also the sleeve 7 with its flange 7a are moved in the direction of the arrow β by means of the steep pitched screw thread.

Owing to the shifting of the sleeve 7 with which the slide ring 5 and the locking claws 4 rigidly connected therewith move, the locking claws 4 of the slide ring 5 are moved out of the notches of the clutch cone 2. After these movements have taken place, the flange 7a of the sleeve 7 bears against a ball bearing 11a which is rigidly connected with the collar 11 of the counter cone 33. The ball bearing 11a serves for reducing the friction between the collar 11 and the flange 7. If the two levers 17 shown on the right side of Fig. 1 are now swung in the same direction, the sleeve 7 with its flange 7a moves on farther in the direction of the arrow β. Consequently the flange shifts the hub 12 and therewith the clutch cone 33 is shifted in the direction of the arrow β against the action of the spring 9, with the result that the clutch cone 33 is disengaged from the clutch cone 2. Consequently the cone 2 can move absolutely independently of its counter cone 33 and the locking claws 4 of the slide ring 5 so that, for example, the rear wheel connected with the axle 42 is entirely disconnected from the drive and rotates idly. This position of the parts of the clutch is illustrated on a larger scale in Fig. 2 and on the left side of Fig. 1.

If the levers shown on the right of Fig. 1 are swung back into their initial position by the rod system 22, all the elements return into the position shown on the right of Fig. 1, that is, the rods 16 are shifted in the direction of the arrow α by the steep pitched screw thread. The flange 7a of the sleeve 7 consequently liberates the ball bearing 11a so that the hub 12 and the counter cone 33 are moved in the direction of the arrow by the forces previously accumulated in the spring 9, until the counter cone 33 bears gently against the clutch cone 2. During the continued movement of the sleeve 7 in the direction of the arrow α together with the slide ring 5 and locking claws 4, the locking claws 4 engage the claws of the clutch claw 2. The movement of the rods 16, the sleeve 7 and the slide ring 5 with the locking claws 4 is assisted by the action of the springs 8 mounted on the rods 16, with the result that the counter cone 33 and the clutch cone 2 interengage before the locking claws 4 of the slide ring 5 can enter the notches 3 of the clutch cone 2. The result is that a gentle engagement and disengagement of the rear wheels with and from the drive is ensured. During this procedure the other rear wheel remains connected with the left clutch cone 2 and is consequently driven.

The procedures above described also apply for the left side of the transmission mechanism illustrated in Fig. 1 in that the two levers illustrated on the left of Fig. 1 are controlled by the rod system 22a. The levers 17, both on the left and also on the right side of the transmission mechanism, are oscillated by a thrust rod effecting the steering of the front wheels of a motor vehicle.

I claim:—

A transmission mechanism for motor vehicles steered by driving in which the driving mechanism between the engine shaft and each of the two rear wheels is engageable and disengageable by means of a claw clutch, comprising in combination for each hub axle a sleeve, a driving cone mounted on said sleeve and having on its end face circumferential notches, a driven counter cone splined on said sleeve and adapted to cooperate with said driving cone, said counter cone having recesses on its circumference, a second sleeve slidable on said counter cone and having an annular groove, a ring engaging in said groove and movable with said second sleeve, claws rigidly mounted on said ring and extending into said recesses, means for shifting said second sleeve to bring said claws into engagement with said notches, and a bolt loosely extending through the first mentioned sleeve for each stub axle adapted to hold together the two halves of the mechanism to facilitate the assembling and dismantling of the mechanism.

HEINRICH BEHRENS.